United States Patent
Yamada et al.

(10) Patent No.: US 7,170,859 B2
(45) Date of Patent: Jan. 30, 2007

(54) MEDIA CONVERTER WITH INTEGRATED LOCAL INFORMATION TRANSMISSION FUNCTION AND FAULT ALARM SIGNAL TRANSMISSION SYSTEM

(75) Inventors: Naoshi Yamada, Sakura (JP); Fumio Yajima, Sakura (JP); Yoshiharu Unami, Sakura (JP); Katsuyuki Arai, Sakura (JP); Yasushi Nakamura, Kumagaya (JP); Shoji Yoshino, Tokyo (JP)

(73) Assignee: Fujikura Ltd., Tokyo (JP)

( * ) Notice: Subject to any disclaimer, the term of this patent is extended or adjusted under 35 U.S.C. 154(b) by 967 days.

(21) Appl. No.: 10/073,756

(22) Filed: Feb. 11, 2002

(65) Prior Publication Data

US 2002/0118413 A1 Aug. 29, 2002

(30) Foreign Application Priority Data

Feb. 28, 2001 (JP) ............................ P2001-055957

(51) Int. Cl.
*H04B 10/08* (2006.01)
*H04B 10/20* (2006.01)
*H04J 14/00* (2006.01)

(52) U.S. Cl. ..................... 370/245; 370/465; 398/17; 398/58

(58) Field of Classification Search ................ 370/537, 370/466, 395.51, 347, 242–250, 465; 359/125, 359/124, 110; 398/17, 58
See application file for complete search history.

(56) References Cited

U.S. PATENT DOCUMENTS

| | | | |
|---|---|---|---|
| 4,482,980 A * | 11/1984 | Korowitz et al. ........... 714/712 |
| 4,651,316 A * | 3/1987 | Kocan et al. ............... 370/462 |
| 5,724,166 A * | 3/1998 | Nakata ......................... 398/61 |
| 5,905,585 A * | 5/1999 | Shirai ........................... 398/20 |
| 5,995,256 A | 11/1999 | Fee |
| 6,043,922 A * | 3/2000 | Koga et al. ................. 398/213 |
| 6,154,774 A | 11/2000 | Furlong |
| 6,204,948 B1 * | 3/2001 | Coffey et al. ............... 398/135 |
| 6,259,704 B1 * | 7/2001 | Asahina et al. ............. 370/460 |
| 6,330,241 B1 * | 12/2001 | Fort ......................... 370/395.1 |
| 6,611,928 B1 * | 8/2003 | Fujiyoshi et al. ........... 714/715 |
| 6,654,562 B1 * | 11/2003 | Murata ......................... 398/79 |
| 6,684,347 B1 * | 1/2004 | Coffey ......................... 714/43 |
| 6,763,025 B2 * | 7/2004 | Leatherbury et al. .. 370/395.64 |
| 6,839,872 B2 * | 1/2005 | Kohda ......................... 714/712 |
| 6,944,364 B2 * | 9/2005 | Ramaswami et al. ......... 385/17 |
| 2002/0039211 A1 * | 4/2002 | Shen et al. ................. 359/110 |
| 2002/0098795 A1 * | 7/2002 | Brede et al. ............... 455/3.01 |
| 2002/0124110 A1 * | 9/2002 | Tanaka ........................ 709/246 |

FOREIGN PATENT DOCUMENTS

JP 03187536 8/1991

* cited by examiner

*Primary Examiner*—Alpus H. Hsu
(74) *Attorney, Agent, or Firm*—Chadbourne & Parke LLP (57) ABSTRACT

There is provided media converter having an integrated local information transmission function and a fault alarm signal communication system for transmitting local information using a frequency outside the communication frequency bands for data signals. In the subscriber's media converter, based on input local information, a control section sets a transmission frequency outside the communication frequency bands and outputs a signal instructing that a transmission be made. A media independent interface section receives this signal and transmits the signal in the instructed frequency. In the station media converter, a media independent interface section detects the frequency in which the local information is transmitted from the received signal. A control section then generates local information using the detected frequency and outputs it to an SNMP unit.

15 Claims, 3 Drawing Sheets

MEDIA CONVERTER WITH INTEGRATED LOCAL INFORMATION TRANSMISSION FUNCTION AND FAULT ALARM SIGNAL TRANSMISSION SYSTEM

BACKGROUND OF THE INVENTION

1. Field of the Invention

The present invention relates to a media converter having an integrated local information transmission function and a fault alarm signal transmission system that enable the transmission of local information with matching media converters to be performed by using a frequency outside the data signal communication frequency band or by controlling the sending of transmission error signals.

2. Description of the Related Art

A media converter converts an Ethernet signal in 10 BASE-T or 100 BASE-TX formats, which are IEEE (Institute of Electrical and Electronics Engineers) 802.3 standards, that use twist pair cable into a signal that corresponds to a 100 BASE-FX format Ethernet that uses optical fiber. In many cases, a media converter is installed at both the subscriber's premises and the station premises and these are used by being matched to each other via a local area network (referred to below as a LAN). In a case such as this, the operating state, for example, the state of the link, whether the power is on or off, or the like of the media converter on the subscriber's side is monitored by the media converter on the station side. When the station media converter is used to monitor the operating state of the subscriber's media converter, an SNMP (Simple Network Management Protocol) unit used for network management is mounted in the subscriber's media converter and the SNMP management device installed at the station side directly monitors the subscriber's media converter via the LAN.

However, in this type of system of the related art in which the operating state of the subscriber's media converter is monitored using an SNMP unit, even when there is only a small amount of local information (here, the local information includes control signals, status information, and interference information including at least one of twist pair cable abnormality information and power source abnormality information) to be transmitted, because the SNMP unit is required on the subscriber's side, the problem has existed that the structure of the device is made more complicated and it has proved difficult hitherto to simplify the structure. In addition, the problem has existed that it has been necessary for an IP (Internet Protocol) address to be allocated to all of the subscriber media converters in which an SNMP unit has been mounted thus causing the management to become extremely complex.

SUMMARY OF THE INVENTION

The present invention has been achieved in view of the above problems and it is an object thereof to provide a media converter having an integrated local information transmission function and a fault alarm signal transmission system that enable the transmission of local information relating to respective media converters to be performed using a simple structure by using a frequency outside the frequency band for data signal communication or by controlling the sending of transmission error signals.

In order to resolve the above problems the first aspect of the present invention is a media converter provided with an integrated local information transmission function for performing conversions between signals of an electrical network and signals of an optical network comprising: a first transmission-reception processing section which performs conversions between the electrical network signals and transmission-reception data in accordance with the transmission format of the electrical network; a second transmission-reception processing section which performs conversions between the optical network signals and transmission-reception data in accordance with the transmission format of the optical network; and a media independent interface section which connects the first transmission-reception processing section with the second transmission-reception processing section and performs data interfacing and also generates error signals in a predetermined plurality of frequencies outside frequency bands used for data communication or detects an error signal in a frequency outside the communication frequency bands, wherein the transmission and reception of local information is performed with media converters that are matched via the optical network.

The second aspect of the present invention is a media converter provided with an integrated local information transmission function comprising: a first transmission-reception processing section which has a transmission section for performing code conversion and encoding on input data and then transmitting resultant data to a 100 BASE-TX local area network and a reception section for performing decoding and code conversion on signals received from the 100 BASE-TX local area network; a second transmission-reception processing section which has a transmission section for performing code conversion and encoding on input data and then transmitting resultant data to a 100 BASE-FX local area network and a reception section for performing decoding and code conversion on signals received via the 100 BASE-FX local area network; a media independent interface section which connects the first transmission reception processing section together with the second transmission-reception processing section and performs data interfacing and error signal transmission; an electrical-optical conversion section which modulates optical signals and sends optical signals to the 100 BASE-FX local area network using signals output from the transmission section of the second transmission-reception processing section; an optical electrical-conversion section which demodulates optical signals received from the 100 BASE-FX local area network and supplies generated data to the reception section of the second transmission-reception processing section; and a control section which controls the media independent interface section, wherein the media independent interface section transmits signals in a predetermined plurality of frequencies outside frequency bands used for data signal communication or detects signals in a frequency outside the communication frequency bands based on an instruction from the control section, and performs the transmission and reception of local information with media converters that are matched via the 100 BASE-FX local area network.

The third aspect of the present invention is a media converter provided with an integrated local information transmission function for performing conversions between signals of an electrical network and signals of an optical network comprising: a first transmission-reception processing section which performs conversions between the electrical network signals and transmission-reception data in accordance with the transmission format of the electrical network; a second transmission-reception processing section which performs conversions between the optical network signals and transmission-reception data in accordance with the transmission format of the optical network; a media independent interface section which connects the first transmission-reception processing section with the second transmission-reception processing section and performs data interfacing and also generates error signals; and a control section which controls transmission timings of transmission error signals and idle signals transmitted from the media independent interface section and causes these signals to be transmitted in combinations, wherein the transmission and reception of local information is performed with media converters that are matched via the optical network.

The fourth aspect of the present invention is a media converter provided with an integrated local information transmission function comprising: a first transmission-reception processing section which has a transmission section for performing code conversion and encoding on input data and then transmitting resultant data to a 100 BASE-TX local area network and a reception section for performing decoding and code conversion on signals received from the 100 BASE-TX local area network; a second transmission-reception processing section which has a transmission section for performing code conversion and encoding on input data and then transmitting it to a 100 BASE-FX local area network and a reception section for performing decoding and code conversion on signals received via the 100 BASE-FX local area network; a media independent interface section which connects the first transmission-reception processing section together with the second transmission-reception processing section and performs data interfacing and error signal transmission; an electrical-optical conversion section which modulates optical signals and sends optical signals to the 100 BASE-FX local area network using signals output from the transmission section of the second transmission-reception processing section; an optical electrical-conversion section which demodulates optical signals received from the 100 BASE-FX local area network and supplies generated data to the reception section of the second transmission reception processing section; and a control section which controls the media independent interface section, wherein as a result of the control section controlling transmission timings of transmission error signals and idle signals transmitted from the media independent interface section and causing these signals to be transmitted in combinations, the transmission and reception of local information is performed with media converters that are matched via the 100 BASE-FX local area network.

In the media converter provided with an integrated local information transmission function according to the fifth aspect of the present invention, on the transmitting side, VALID symbols and INVALID symbols are transmitted alternately and, on the reception side, a normal data reception state and an error reception state are alternately generated and the transmission of local information is performed based on the changes in the states.

According to the media converter provided with an integrated local information transmission function of the present invention, because it is possible to form a line for the exchange of local information and control signals without using an SNMP unit which has a complicated apparatus structure, the structure of the media converter can be simplified and the cost of the device can be reduced. Moreover, control of the media converter at the subscriber's premises becomes possible from the media converter at the station's premises. In addition, it becomes possible to set from the station side the communication mode and communication speed of the interface with the LAN of the subscriber media converter, which uses a twist pair cable, enabling the management of the network to be simplified.

In the fault alarm signal transmission system of the present invention, a first media converter installed at subscriber premises comprises: a power cut detection section which detects a reduction in a voltage of a power supply supplied to the media converter and outputs a power supply abnormality signal; a control section which outputs a control signal based on the power supply abnormality signal input from the power cut detection section; a layer 1 signal generating section which receives the control signal from the control section and generates a layer 1 signal; and a multiplexing section which multiplexes encoded transmission data with the layer 1 signal output from the layer 1 signal generating section, and in which a second media converter installed at station premises comprises: a layer 1 signal detection section installed so as to match the first media converter via a 100 BASE-FX local area network which detects layer 1 signals from received data signals, wherein when a drop in the power supply voltage is detected by the power cut detection section, the first media converter halts normal data transmission and outputs a power cut notification signal from the layer 1 signal generating section, and the second media converter detects the power cut notification signal from the received data signals in the layer 1 signal detection section and outputs a fault alarm signal.

According to the fault alarm signal transmission system of the present invention, because it is possible to form a line for sending important alarm signals such as those about power supply abnormalities without these going through the transmission-reception processing section or media independent interface section, fault diagnosis is simplified and circuit conservation is made easier.

DETAILED DESCRIPTION OF THE PREFERRED EMBODIMENTS (First Embodiment)

Figure 1:
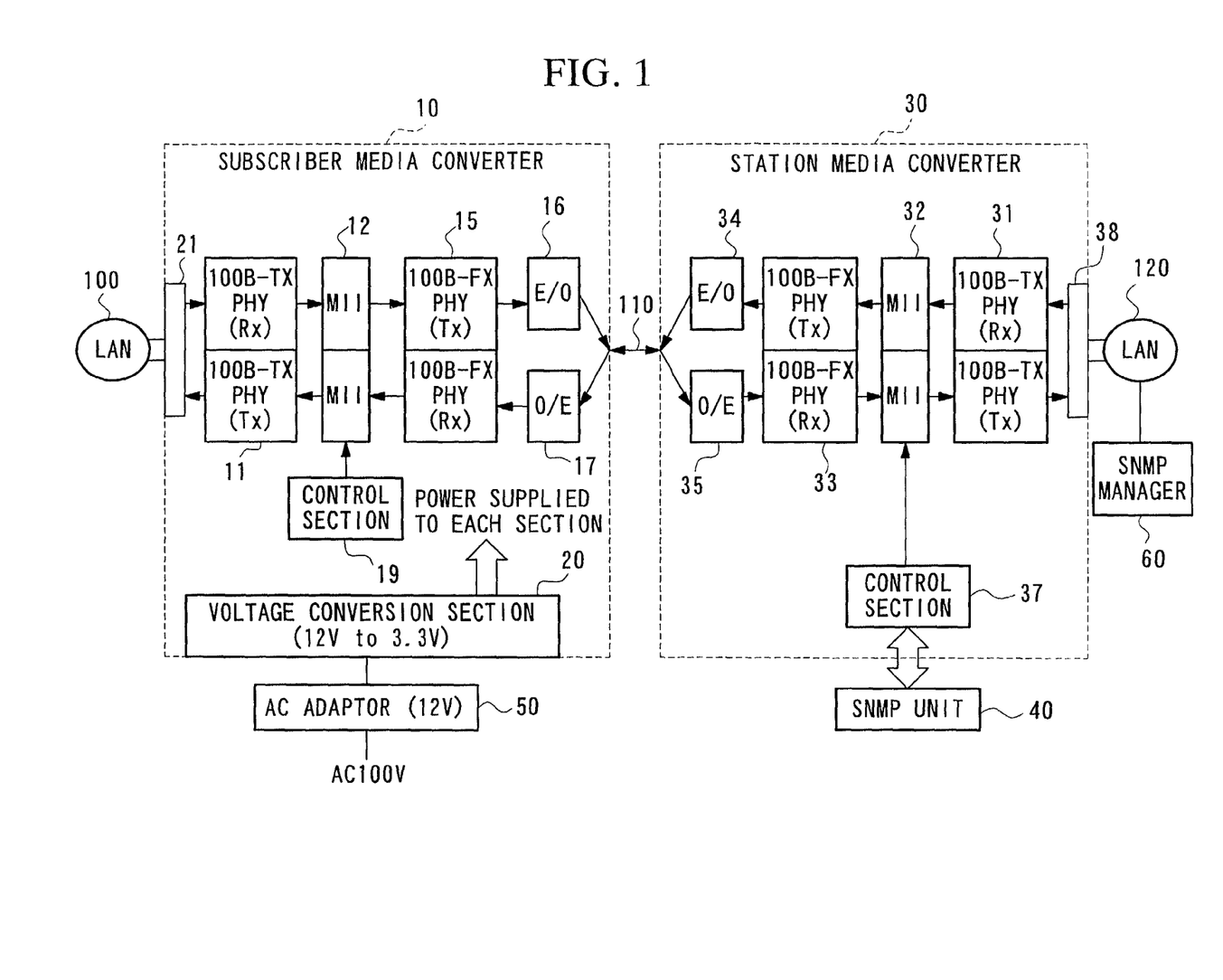
FIG. 1 is a block diagram showing the structure of a media converter according to the first and second embodiments of the present invention.

The first embodiment of the present invention is described below with reference made to the drawings. FIG. 1 is a block diagram showing the structure of the media converter having an integrated local information transmission function according to the first embodiment. In FIG. 1, 10 indicates the media converter installed at the subscriber side (referred to below as the subscriber media converter). 11 indicates a transmission-reception processing section (PHY) for processing signals using a protocol at the physical layer level that comprises a transmission section (Tx) and a reception section (Rx) based on the 100 BASE-TX standard. Here, the transmission section performs 4B/5B code conversion on input data in order that "0" and "1" have the appropriate generation frequency, and generates signals using the NRZI (Non Return to Zero Invert on ones) format. Furthermore, after a scramble operation has been carried out on these encoded signals, they are converted into MLT-3 (Multi-Level Transmission-3) ternary signals and output to the 100

BASE-TX LAN 100 via a connector 21. The reception section descrambles the signals received from the LAN 100, decodes them, and generates data.

15 indicates a transmission-reception processing section (PHY) comprising a reception section (Rx) and a transmission section (Tx) based on the 100 BASE-FX standard for processing signals using a protocol at the physical layer level. Here, the receiving section performs 4B/5B code conversion on input data, generates signals using the NRZI format and outputs these. The receiving section decodes received signals, performs code conversion on them, and generates data. 12 indicates a media independent interface section (MII) that connects the transmission-reception processing section 11 and the transmission-reception processing section 15 and performs data interfacing as well as the transmitting and receiving of signals such as TX_ER signals (transmission error signals) and RX_ER signals (reception error signals). The media independent interface section 12 has the function of sending for local information transmission a plurality of frequencies that are outside the data signal communication frequency band and the function of detecting frequencies that are outside the data signal communication frequency band. In communication based on the 100 BASE-TX standard and the 100 BASE-FX standard that use the 4B/5B code conversion format, the highest frequency for data signals is 62.5 MHz while the lowest frequency is 12.5 MHz. Accordingly, a frequency is selected for the transmission of local information that is outside this frequency band and that interferes as little as possible with the frequencies used for data signal communication.

The control section 19 sends control signals to the media independent interface section 12, on the basis of input local information, for example, signals such as twist pair cable abnormality signals and power source abnormality signals, such that frequencies allocated for each alarm are transmitted. Note that the number of frequencies allocated for each alarm signal is not limited to one frequency and it is also possible to increase the amount of information to be sent by combining and sending a plurality of frequencies. 16 indicates an electrical-optical conversion section (E/O) that modulates optical signals using data output from the transmission section of the transmission-reception processing section 15 and outputs the modulated optical signals to a 100 BASE-FX optical fiber 110. 17 indicates an optical-electrical conversion section (O/E) that generates data by demodulating the optical signals input from the optical fiber 110. A voltage conversion section 20 converts the voltage (for example, 12V) supplied from an AC adaptor 50 into the voltage required by each section (for example, 3.3V) and supplies this to each section.

30 indicates a media converter installed at the station side (referred to below as the station media converter). 31 indicates a transmission-reception processing section comprising a reception section (Rx) and a transmission section (Tx) based on the 100 BASE-TX standard. Here, the transmission section performs 4B/5B code conversion on input data and encodes it using the NRZI format. In addition, the transmission section performs a scramble operation on these encoded signals, converts them into MLT-3 ternary signals, and outputs them to a 100 BASE-TX LAN 120 via a connector 38. The reception section descrambles the signals received from the LAN 120 via the connector 38, performs decoding and code conversion, and generates data. 33 indicates a transmission reception processing section comprising a reception section (Rx) and a transmission section (Tx) based on the 100 BASE-TX standard. The transmission section performs 4B/5B code conversion on input data, encodes it using the NRZI format, and outputs it. The reception section performs decoding and code conversion on the received signals and generates data. 32 indicates a media independent interface section that connects the transmission-reception processing section 31 and the transmission-reception processing section 33, performs data interfacing, transmits and receives signals such as TX_ER signals (transmission error signals) and RX_ER signals (reception error signals), and outputs frequencies for the transmission of local information.

34 indicates an electrical-optical conversion section that modulates optical signals using data output from the transmission section of the transmission-reception processing section 33 and outputs the modulated optical signals to the 100 BASE-FX optical fiber 110. 35 indicates an optical-electrical conversion section that generates data by demodulating the optical signals input from the optical fiber 110. The control section 37 controls the output using the media independent interface section 32 of alarm signals and also carries out the control of other sections. In addition, the control section 37 supplies information to the SNMP manager 60 (the network management manager) and the SNMP unit 40 that performs the transmission and reception of network management information.

Next, the operation of transmitting local information using the media converter having an integrated local information transmission function according to the above structure will be described. Here, the local information will be taken as alarm signals of twist pair cable abnormalities sent from the subscriber media converter 10 to the station media converter 30. Firstly, when a twist pair cable abnormality is detected by the subscriber media converter 10, a detection signal (not illustrated) is supplied to the control section 19. The control section 19 determines the type of detection signal and outputs to the media independent interface section 12 a control signal instructing the sending of a signal in the transmission frequency (for example, in a frequency of 1 MHz which is outside the frequency band for data signal communication) allocated beforehand (a transmission frequency is allocated beforehand for each signal). The media independent interface section 12 receives this control signal and sends a signal in the instructed frequency to the station media converter 30 via the transmission-reception processing section 15, the electrical-optical conversion section 16, and the optical fiber 110. In the station media converter 30, the media independent interface section 32 detects the frequency outside the frequency band for data signal communication from the signal received via the optical-electrical conversion section 35 and the transmission-reception processing section 33 and outputs this frequency. The control section 37 generates a twist pair cable abnormality alarm signal on the basis of the signal detected by the media independent interface section 32 and outputs it to a device (not illustrated) in which the SNMP unit 40 has been mounted.

(Second Embodiment)

A description will be given next of the second embodiment of the present invention. The basic structure of the media converter with an integrated local information transmission function according to the second embodiment is the same as that of the first embodiment. Accordingly, FIG. 1, which was used for the first embodiment, is also used here. Note that the control section 19 of the present embodiment controls the TX_EN and TX_ER transmitted from the media independent interface section 12 and also controls the transmission timings of the IDLE signals and HALT signals transmitted from the transmission-reception processing section 15. The control section 37 controls the TX_EN and TX_ER transmitted from the media independent interface section 32 and also controls the transmission timings of the IDLE signals and HALT signals transmitted from the transmission-reception processing section 33. The code group used in the transmission of the TX_ER and IDLE signals is stipulated in Table 24-1 of article 24 of IEEE standard 802.3 that regulates 100 BASE-TX/FX. TX_ER is a control input signal for notifying about an abnormality on the transmitting side, while TX_EN is a control signal for instructing that data be transmitted. Here, if TX_ER is 1 and TX_EN is 1, then "H" (HALT signal) "00100" of the INVALID code group is transmitted. If TX_ER is set to low level or if TX_EN is set to low level, then "I" (IDLE signal) "11111" of the VALID code group is transmitted. The frequency of the IDLE signal is 62.5 MHz, while the frequency of the HALT signals is 12.5 MHz. RX_ER is a signal indicating an error in the received data, as described above, and is asserted when code group "H" is received and de-asserted when code group "I" is received.

Figure 3:
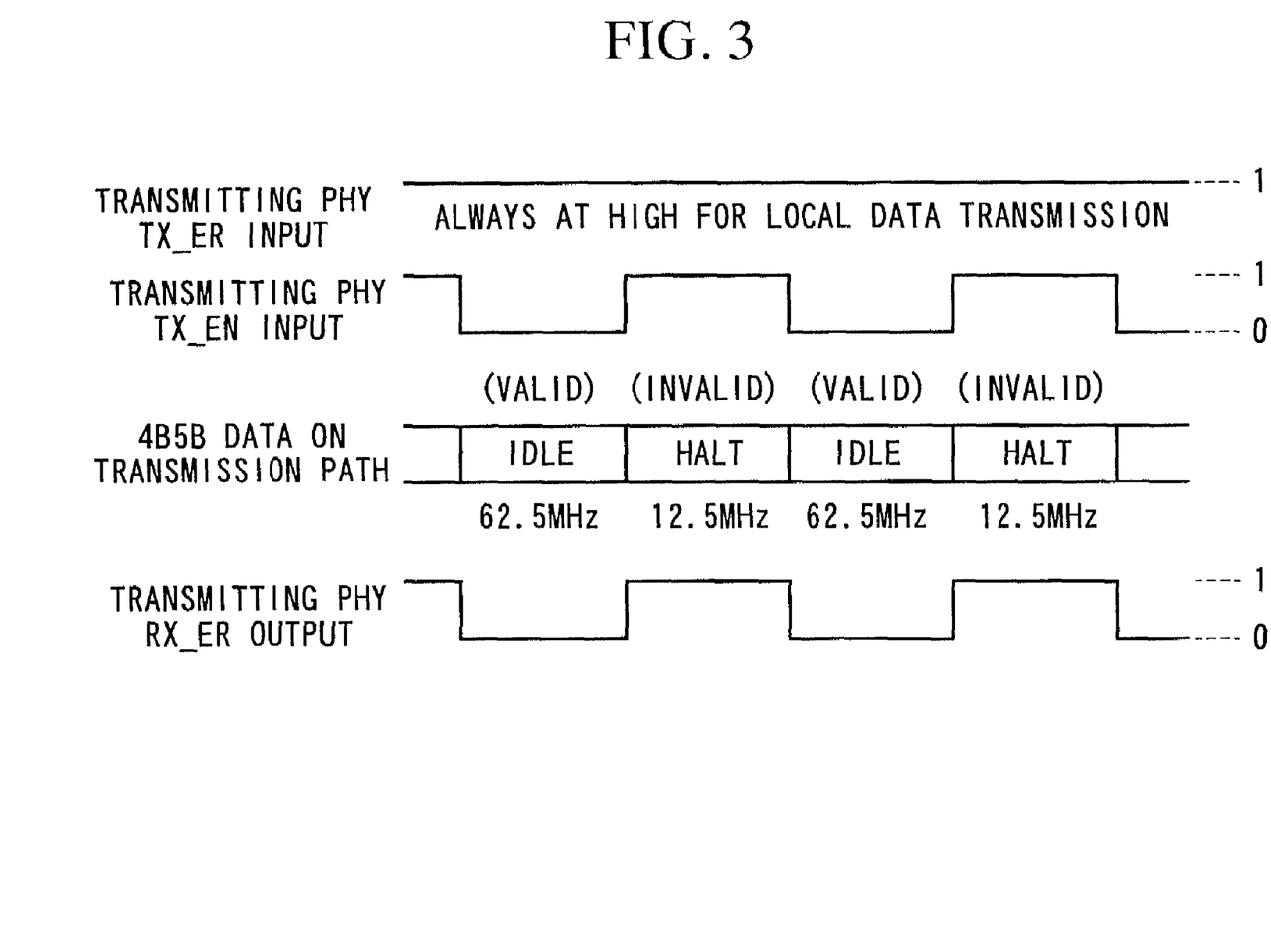
FIG. 3 is a view showing a waveform in which local information is transmitted in the second embodiment of the present invention.

FIG. 3 is a view showing the waveform of the TX_ER, TX_EN, and RX_ER. The operation of the second embodiment will be described with reference made to FIG. 3. Here, local information will be taken as being sent from the subscriber media converter 10 via the optical fiber 110 to the station media converter 30. Based on the input local information, the control section 19 outputs a "1" or "0" TX_EN as is shown in "Transmitting PHY TX_EN Input" in FIG. 3. The timing of the transmission of the TX_EN "1" or "0" can be changed by the input local information. The media independent interface section 12 receives the TX_EN from the control section 19 and transmits a combination thereof with the code group "H" or the code group "I".

The "4B5B data on Transmission Path" in FIG. 3 shows the waveform of the signals output from the media independent interface section 12. In this example, a 62.5 MHz frequency IDLE signal and a 12.5 MHz HALT signal are transmitted alternately. The transmitted IDLE signals and HALT signals are received by the station media converter 30 via the optical fiber 110 and are detected by the media independent interface section 32. As is shown by the "Transmitting PHY RX_ER Output" in FIG. 3, an RX_ER with the same waveform as the "Transmitting PHY TX_EN Input" is then output. In this way, because data is transmitted by changing the timing of the transmission of the "1" or "0" as the TX_EN and data is received by monitoring the RX_ER, it is possible to obtain signals that appear as if they have been FM modulated (frequency modulated), and this results in communication being made possible between media converters.

Namely, because the IDLE signal is a repetition of "1"/ "0" at 62.5 MHz and the HALT signal is a repetition of "1"/"0" at 12.5 MHz, if the IDLE signal and the HALT signal are corresponded respectively, for example, to the "1" and "0" of the local information, it is possible to represent combinations of these signals by combinations of frequencies. Here, because it is possible to generate IDLE signals and HALT signals as desired by TX_EN, it is possible to obtain signals that have the appearance of FM modulated signals by controlling the TX_EN, without having to actually prepare an FM modulator. As a result, according to this second embodiment, by manipulating the timing when the TX_EN is on and off, it is possible to generate local information as desired and, moreover, the transmission of information using FM modulation is possible without special circuitry having to be provided.

In addition, according to the second embodiment, because the signals that are actually transmitted as the local information carriers are IDLE signals and HALT signals used in normal communication, there is no need to restrict the frequency band in order to transmit the local information as in the above-described first embodiment. As a result, it is possible to resolve the problems of band restrictions on the transmission paths and electrical circuits. Namely, if the signal is one that is sufficiently slower than the carrier frequency, because transmission is possible no matter what the size of the pulse width of the signal, the advantages are achieved that it is possible to increase the amount of information that may be transmitted and simplify the judgment of the receiving side.

Incidentally, as shown in FIG. 3, TX_ER is fixed to "1" and TX_EN alternates between "1" and "0". However, the operation of the media converter is not restricted to this, and hence it is possible to operate the media converter such that TX_EN is fixed to "1" and TX_ER alternates between "1" and "0".

Third Embodiment

Figure 2:
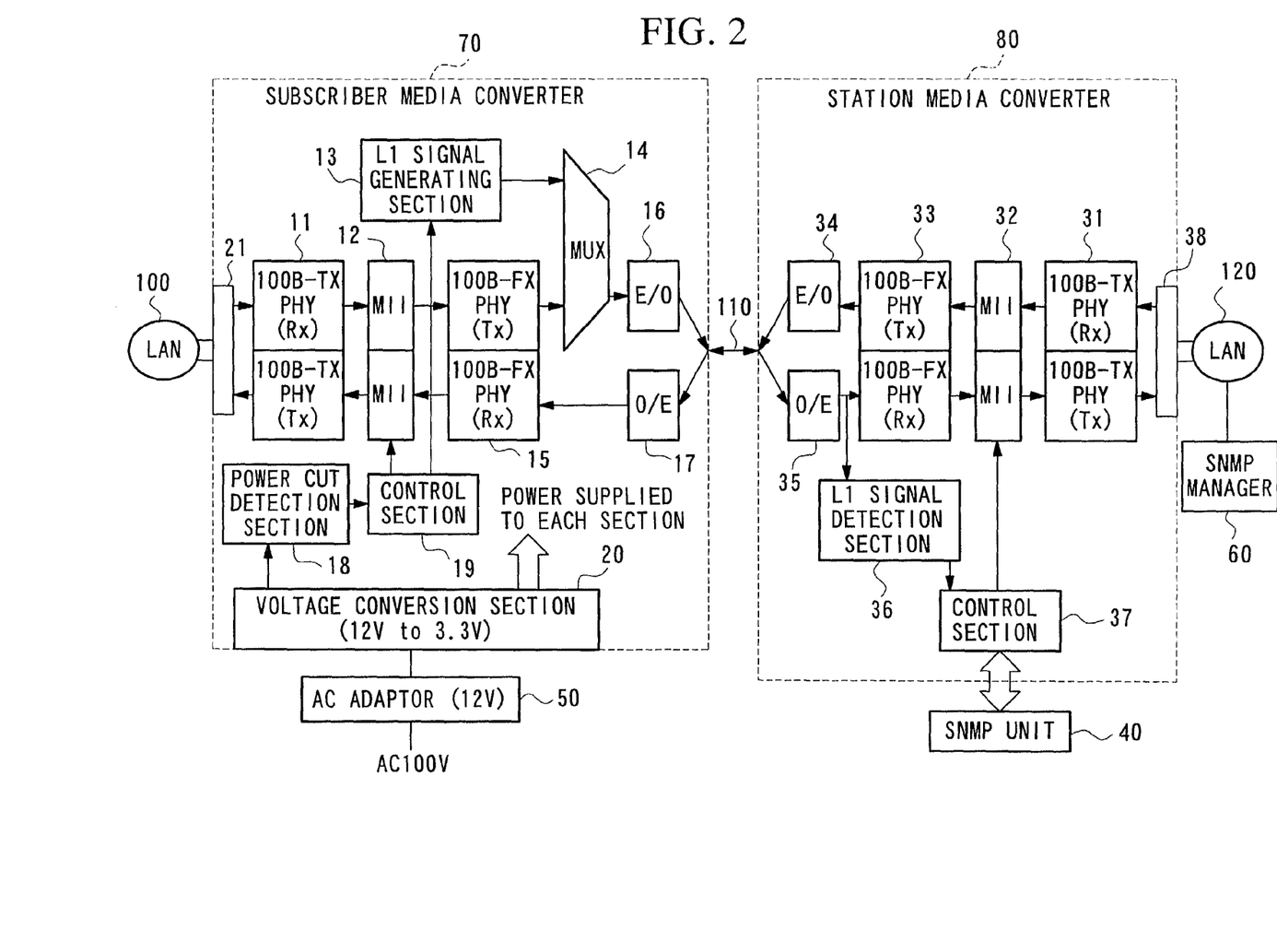
FIG. 2 is a block diagram showing the structure of a media converter according to the third embodiment of the present invention.

A description will now be given of the third embodiment of the present invention with reference made to the drawings. FIG. 2 is a block diagram showing the structure of the media converter with an integrated local information transmission function according to the third embodiment. Note that, in FIG. 3, the same descriptive symbols are given to the same portions as in FIG. 1 which shows the structure of the media converters 10 and 30 and a description thereof is omitted here. 70 indicates the subscriber media converter while 80 indicates the station media converter. 18 indicates a power cut detecting section for monitoring the input voltage and output voltage of the voltage conversion section 20, and for detecting an abnormality and outputting a fault alarm signal when the power voltage drops below a preset alarm level. 13 indicates a layer 1 (L1) signal generating section that generates a power cut notification signal using a control signal output from the control section 19 based on the fault alarm signal. 14 indicates a multiplexing section (MUX) for multiplexing the output from the layer 1 signal generating section 13 and the output from the transmission section forming part of the transmission-reception processing section 15. 36 indicates a layer 1 signal detection section for detecting power cut notification signals from the data signals demodulated by the optical-electrical conversion section 35.

A description will be given next of the operation of the third embodiment which is structured in this manner. Firstly, in the subscriber media converter 70 the power cut detection section 18 compares the input voltage and output voltage of the voltage conversion section 20 with a predetermined voltage and outputs a fault alarm signal to the control section 19 when the power supply voltage goes below a predetermined voltage. The control section 19 receives this fault alarm signal and supplies a control signal instructing that normal data transmission be stopped to the media independent interface section 12. The control section 19 also sends a control signal to the layer 1 signal generation section 13 causing it to transmit a power cut notification signal. The multiplexing section 14 generates a multiplexed signal from the output from the layer 1 signal generation section 13 and the output from the transmission section of the transmission-reception processing section 15. The electrical-optical conversion section 16 transmits an optical signal modulated by the output from the layer 1 signal generation section 13. In the station media converter 80 the signal received via the optical fiber 110 is converted into a data signal in the optical-electrical conversion section 35. The layer 1 signal detection section 36 detects the power cut notification signal from this data signal and outputs it to the control section 37. The control section 37 generates a fault alarm signal on the basis of this power cut notification signal and notifies the device (not illustrated) in which the SNMP unit 40 is mounted.

What is claimed is:

1. A media converter provided with an integrated local information transmission function for performing conversions between signals of an electrical network and signals of an optical network comprising:
   a first transmission-reception processing section which performs conversions between the electrical network signals and transmission-reception data in accordance with the transmission format of the electrical network;
   a second transmission-reception processing section which performs conversions between the optical network signals and transmission-reception data in accordance with the transmission format of the optical network; and
   a media independent interface section which connects the first transmission reception processing section with the second transmission-reception processing section and performs data interfacing and also generates error signals in a predetermined plurality of frequencies outside frequency bands used for data communication or detects an error signal in a frequency outside the communication frequency bands, wherein
   the transmission and reception of local information is performed with media converters that are matched via the optical network.

2. The media converter provided with an integrated local information transmission function according to claim 1, wherein the frequencies of the error signals are selected so as not to substantially interfere with the frequencies used for the data communication.

3. A media converter provided with an integrated local information transmission function comprising:
   a first transmission-reception processing section which has a transmission section for performing code conversion and encoding on input data and then transmitting resultant data to a 100 BASE-TX local area network and a reception section for performing decoding and code conversion on signals received from the 100 BASE-TX local area network;
   a second transmission-reception processing section which has a transmission section for performing code conversion and encoding on input data and then transmitting resultant data to a 100 BASE-FX local area network and a reception section for performing decoding and code conversion on signals received via the 100 BASE-FX local area network;
   a media independent interface section which connects the first transmission reception processing section together with the second transmission-reception processing section and performs data interfacing and error signal transmission;
   an electrical-optical conversion section which modulates optical signals and sends optical signals to the 100 BASE-FX local area network using signals output from the transmission section of the second transmission-reception processing section;
   an optical electrical-conversion section which demodulates optical signals received from the 100 BASE-FX local area network and supplies generated data to the reception section of the second transmission-reception processing section; and
   a control section which controls the media independent interface section, wherein
   the media independent interface section transmits signals in a predetermined plurality of frequencies outside frequency bands used for data signal communication or detects signals in a frequency outside the communication frequency bands based on an instruction from the control section, and performs the transmission and reception of local information with media converters that are matched via the 100 BASE-FX local area network.

4. The media converter provided with an integrated local information transmission function according to claim 3, wherein the control section gives instructions to the media independent interface section for signals to be transmitted in one frequency or in a plurality of frequencies based on input local information.

5. The media converter provided with an integrated local information transmission function according to claim 3, wherein local information transmitted by the media independent interface section using frequencies outside the communication frequency bands includes control signals, status information, and fault information that includes at least one of twist pair cable abnormalities and power supply abnormalities.

6. The media converter provided with an integrated local information transmission function according to claim 3, wherein the predetermined plurality of frequencies are selected so as not to substantially interfere with the frequencies used for the data signal communication.

7. A media converter provided with an integrated local information transmission function for performing conversions between signals of an electrical network and signals of an optical network comprising:
   a first transmission-reception processing section which performs conversions between the electrical network signals and transmission-reception data in accordance with the transmission format of the electrical network;
   a second transmission-reception processing section which performs conversions between the optical network signals and transmission-reception data in accordance with the transmission format of the optical network;
   a media independent interface section which connects the first transmission reception section processing with the second transmission-reception processing section and performs data interfacing and also generates error signals; and
   a control section which controls transmission timings of transmission error signals and idle signals transmitted from the media independent interface section and causes these signals to be transmitted in combinations, wherein
   the transmission and reception of local information is performed with media converters that are matched via the optical network.

8. The media converter provided with an integrated local information transmission function according to claim 5, wherein the frequencies of the transmission error signals are selected so as not to substantially interfere with the frequencies used for communicating the transmission-reception data.

9. The media converter provided with an integrated local information transmission function according to claim 7, wherein the error signals are asserted when transmitting the local information, and values of the idle signals are changed in accordance with the local information.

10. The media converter provided with an integrated local information transmission function according to claim 7, wherein the frequencies of the idle signals are different from the frequencies of the error signals.

11. A media converter provided with an integrated local information transmission function comprising:
- a first transmission-reception processing section which has a transmission section for performing code conversion and encoding on input data and then transmitting resultant data to a 100 BASE-TX local area network and a reception section for performing decoding and code conversion on signals received from the 100 BASE-TX local area network;
- a second transmission-reception processing section which has a transmission section for performing code conversion and encoding on input data and then transmitting it to a 100 BASE-FX local area network and a reception section for performing decoding and code conversion on signals received via the 100 BASE-FX local area network;
- a media independent interface section which connects the first transmission-reception processing section together with the second transmission-reception processing section and performs data interfacing and error signal transmission;
- an electrical-optical conversion section which modulates optical signals and sends optical signals to the 100 BASE-FX local area network using signals output from the transmission section of the second transmission-reception processing section;
- an optical electrical-conversion section which demodulates optical signals received from the 100 BASE-FX local area network and supplies generated data to the reception section of the second transmission reception processing section; and
- a control section which controls the media independent interface section, wherein
- as a result of the control section controlling transmission timings of transmission error signals and idle signals transmitted from the media independent interface section and causing these signals to be transmitted in combinations, the transmission and reception of local information is performed with media converters that are matched via the 100 BASE-FX local area network.

12. The media converter provided with an integrated local information transmission function according to claim 11, wherein the local information transmitted by the media independent interface section includes fault information, status information, and control signals.

13. The media converter provided with an integrated local information transmission function according to claim 11, wherein the frequencies of the transmission error signals are selected so as not to substantially interfere with the frequencies used for data communication.

14. The media converter provided with an integrated local information transmission function according to claim 11, wherein the transmission error signals are asserted when transmitting the local information, and values of the idle signals are changed in accordance with the local information.

15. The media converter provided with an integrated local information transmission function according to claim 11, wherein the frequencies of the idle signals are different from the frequencies of the transmission error signals.

* * * * *

UNITED STATES PATENT AND TRADEMARK OFFICE
CERTIFICATE OF CORRECTION

PATENT NO. : 7,170,859 B2
APPLICATION NO. : 10/073756
DATED : January 30, 2007
INVENTOR(S) : Naoshi Yamada et al.

It is certified that error appears in the above-identified patent and that said Letters Patent is hereby corrected as shown below:

Claim 8 Column 10 line 60 please change "according to claim 5" to --acording to claim 7--.

Signed and Sealed this

Fourteenth Day of August, 2007

JON W. DUDAS
*Director of the United States Patent and Trademark Office*